United States Patent
Dasari et al.

[11] Patent Number: 5,276,742
[45] Date of Patent: Jan. 4, 1994

[54] RAPID DETECTION OF PAGE ORIENTATION

[75] Inventors: Lakshmi Dasari; Dan S. Bloomberg, both of Palo Alto, Calif.

[73] Assignee: Xerox Corporation, Rochester, N.Y.

[21] Appl. No.: 794,551

[22] Filed: Nov. 19, 1991

[51] Int. Cl.$^5$ .......................... G06K 9/32; G09G 1/06
[52] U.S. Cl. ..................................... 382/46; 395/137; 345/126
[58] Field of Search .................. 382/46, 44, 61, 9, 18, 382/41; 358/488; 340/727; 395/137

[56] References Cited

U.S. PATENT DOCUMENTS

| | | | |
|---|---|---|---|
| 2,905,927 | 9/1959 | Reed | 340/149 |
| 3,967,243 | 6/1976 | Kawa | 382/46 |
| 4,251,799 | 2/1981 | Jih | 382/46 |
| 4,558,461 | 12/1985 | Schlang | 382/46 |
| 4,723,297 | 2/1988 | Postl | 382/45 |
| 4,866,784 | 9/1989 | Barski | 382/46 |
| 4,876,732 | 10/1989 | Miyagawa et al. | 382/46 |
| 4,926,490 | 5/1990 | Mano | 382/9 |
| 4,953,230 | 8/1990 | Kurose | 382/46 |
| 4,985,930 | 1/1991 | Takeda et al. | 382/56 |
| 5,054,098 | 10/1991 | Lee | 382/44 |
| 5,077,811 | 12/1991 | Onda | 382/44 |
| 5,129,014 | 7/1992 | Bloomberg | 382/49 |
| 5,172,422 | 12/1992 | Tan | 358/488 |

FOREIGN PATENT DOCUMENTS 431962A 12/1991 European Pat. Off. .............. 382/46

Primary Examiner—Joseph Mancuso
Assistant Examiner—David Fox
Attorney, Agent, or Firm—Oliff & Berridge

[57] ABSTRACT

A method of apparatus for automatic page orientation of a scanned image which compares the number of character ascending pixels to the number of character descending pixels in the image to determine if the image is properly aligned or is 90° or 180° out of orientation. The method and apparatus includes morphologically processing the bitmap of the scanned image using structuring elements for isolating the character ascenders and descenders. When page orientation is improper, the bitmap image of the scanned image is rotated to correct the misalignment.

17 Claims, 6 Drawing Sheets

```
}
    moveToScale(1)
    reduceSelect(1,0,0,0,0,0,0,1)
    reduceSelect(1,0,0,0,0,0,0,1)

dilate(pr1,pr0,strel7h)
    copy(pw0,pr1)

erode(pr2,pr1,s_asc_41)
    copy(pw0,pr2)
    int4 = number(pr2,pixels)
    print(int4)

erode(pr3,pr1,s_asc_4r)
    copy(pw0,pr3)
    int5 = number(pr3,pixels)
    print(int5)

erode(pr4,pr1,s_desc_41)
    copy(pw0,pr4)
    int6 = number(pr4,pixels)
    print(int6)

erode(pr5,pr1,s_desc_4r)
    copy(pw0,pr5)
    int7 = number(pr5,pixels)
    print(int7)

int8 = (int4 + int5)
    int9 = (int6 + int7)
    print(int8)
    print(int9)
}
```

FIG.6

RAPID DETECTION OF PAGE ORIENTATION

BACKGROUND OF THE INVENTION

1. Field of the Invention

The present invention relates to improvements in methods and apparatuses for image processing, and more particularly to an improved method and apparatus for automatically determining and correcting the orientation of an image for document processing, specifically for determining and correcting the orientation of an image of a document that is 90° or 180° out of alignment.

2. Background and References

The present invention has wide applications in document image processing, both in traditional optical character recognition processing, and in scanned image processing, as well. In optical character recognition (OCR) systems, typically a bitmap representation of an image is accepted as an input, generally created by an optical scanner. In the operation of such systems, a user usually feeds the page or pages to be scanned into the document scanner by hand. However, a serious and common problem often occurs when the user feeds the pages in the wrong orientation, for example, with the top of the image on the document rotated either 90° (clockwise or counter-clockwise) or 180° (upside down) with respect to the expected orientation of the characters on the page.

Present day commercial OCR systems do not typically check for such a misorientation condition. Instead, they proceed to process the document as normal, by segmenting the page and sending bitmaps of the individual characters to the character classifier module. As the bitmaps are rotated from the expected orientation, the results are poor. Few characters are usually identified at all, and the characters that are identified are generally incorrectly classified. In addition, a long time is required to determine the bad results, since the patterns are unfamiliar to the classifier, and the classifier typically tries several subroutines that are slow and not expected to be run often. Finally, no warning is given to the user that the results are bad.

U.S. Pat. No. 2,905,927 to Reed describes a method and apparatus for recognizing words that employs three scans to determine the characteristics or pattern of the word to be identified. The upper scan obtains information indicating the number and position of full-height symbols and the lower scan derives information indicative of symbols extending below the base line. The center scan acquires information relative to the number of symbols in the word and the symbol spacing.

U.S. Pat. No. 4,953,230 to Kurose describes a system for processing and correcting the skew of a document image that scans the document and determines the location of a first appearing black pixel. Thereafter in subsequent contiguous scans when no black pixels are detected in a scan, it is determined that the right-hand end of the character line has been found. A mathematical determination of the skew of the document is determined using the line numbers and widths of the character lines in order to find the skew or slope of the character lines in reference to the horizontal (or vertical) scanning.

U.S. Pat. No. 4,723,297 to Postl describes a method for automatic correction of character skew in the acquisition of a text original. The text original is in the form of digital scan results, and the method contains an "identification of skewed position" step and an "electronic rotation" step. The identification of skewed position can be determined by the search scan method or the search sweep method. The search scan method of skew determination involves summing and comparing the scan results between scanned search lines beginning with Y=O on an XY plane. The search sweep method of skew determination utilizes Fourier transforms for summation of scanned regions. An angle, $\alpha$, is established in either skew determination step and electronic rotation of the scanned image provides correct image alignment.

U.S. Pat. No. 4,926,490 to Mano describes a method and apparatus for recognizing characters on a document, even if the document is skewed or not aligned with the axis of a typical segmentation apparatus, such as a scanner. A plurality of rectangles are formed surrounding respective character images, with position data for each rectangle stored in a first table in which plural position data of the rectangles are arranged in order from the left-most rectangle to the right-most rectangle in the X direction of the XY coordinates of the image buffer. By determining the rectangles belonging to one character row in the first list and calculating the positions of the bottom left corners of the rectangles, skew of the document is calculated. Vertical positions of the rectangles compensated by the skew in the Y direction are calculated to transfer the position data of the rectangles belonging to the first character row to a second table. The image data surrounded by the rectangles specified by the position data in the second list are sequentially supplied to a character recognition unit.

SUMMARY OF THE INVENTION

In light of the above, it is, therefore, an object of the invention to provide an improved method and apparatus for image processing.

It is another object of the invention to provide a method and apparatus for determining page orientation in document image processing.

It is another object of the invention to provide a method and apparatus for determining and correcting the orientation of an image of a document that is 90° or 180° out of alignment.

It is another object of the invention to provide a method and apparatus for document processing of the type described that can be used with optical character recognition processing techniques as well as scanned image processing techniques.

It is another object of the invention to provide a method and apparatus of the type described for processing images that can rapidly determine the orientation of the text of an image of a document to be processed.

Another object of the invention is to provide an apparatus and method that automatically rotates an image bitmap from a document image to overcome the problem of improper page orientation without slowing down the operation of the scanning device.

It is yet another object of the invention to provide an apparatus and method for rapid page orientation utilizing binary morphological operations.

These and other objects, features and advantages of the invention will be apparent to those skilled in the art from the following detailed description of the invention, when read in conjunction with the accompanying drawings and appended claims.

In accordance with a broad aspect of one embodiment of the invention, a method of determining the orientation an image of a document for processing is presented. According to the method, an electronic representation of the image of the document is produced, and the orientation of the image from a difference between the number of characters ascenders and descenders in the electronic representation is determined. If the number of ascenders is larger than the number of descenders by a predetermined amount, the document is correctly oriented. If the number of ascenders is less than the number of descenders by a predetermined amount the image is rotated by 180°, and if the number of ascenders is neither greater nor less than the number of descenders by the predetermined amount, the image is rotated by 90°. The method may be performed by a data processing system that sequentially executes program instructions in a predetermined sequence.

In accordance with a broad aspect of another embodiment of the invention, a method of orienting a scanned image of Roman text is presented. According to the method, the scanned image is dilated with a horizontal structuring element. The dilated image is then eroded with a pattern ascender set of structuring elements, forming a first eroded image, the pattern ascender set providing ascender pixel integrity, and the number, $N_a$, of "on" pixels in the first eroded image is counted. The dilated image is then again eroded with a pattern descending set of structuring elements, forming a second eroded image, the pattern descending set providing descender pixel integrity, and the number, $N_d$, of "off" pixels in the second eroded image is counted. When $$|N_a - N_d| \leq 3\left(\frac{(\sqrt{N_a} + \sqrt{N_d})}{\sqrt{2}}\right)$$

the bitmap is rotated 90 degrees. When $$|N_a - N_d| > 3\left(\frac{(\sqrt{N_a} + \sqrt{N_d})}{\sqrt{2}}\right)$$

and $N_a < N_d$ the bitmap is rotated 180 degrees.

In accordance with still another broad aspect of the invention, apparatus for determining the orientation of text on a document is provided. In one embodiment of the apparatus, a scanning apparatus scans the document to produce an electronic representation of the text on the document. A data processing system performs data driven processing and includes sequential execution processing means for performing functions by executing program instructions in a predetermined sequence contained in a memory means. The program instructions operate the sequential execution processing means to determining the orientation of the image from a difference between the number of characters ascenders and descenders in the electronic representation. In one embodiment of the apparatus, the scanning apparatus comprises an electrostatographic reproduction machine having means for scanning the document. The program instructions operate the data processing system to produce a bitmap of the identified word units, and to rotate the bitmap when the number of ascenders is less than the number of descenders. If the number of ascenders is less than the number of descenders by a predetermined amount, the bitmap is rotated by 180°, and if difference between the number of ascenders is neither greater nor less than the number of descenders by a predetermined amount, the bitmap is rotated by 90°.

BRIEF DESCRIPTION OF THE DRAWINGS

The invention is illustrated in the accompanying drawing, in which:

FIG. 6 is a computer program instruction listing for programming a digital computer to determine the number of ascenders and descenders of a document text.

DETAILED DESCRIPTION OF THE PREFERRED EMBODIMENTS

Figure 1:
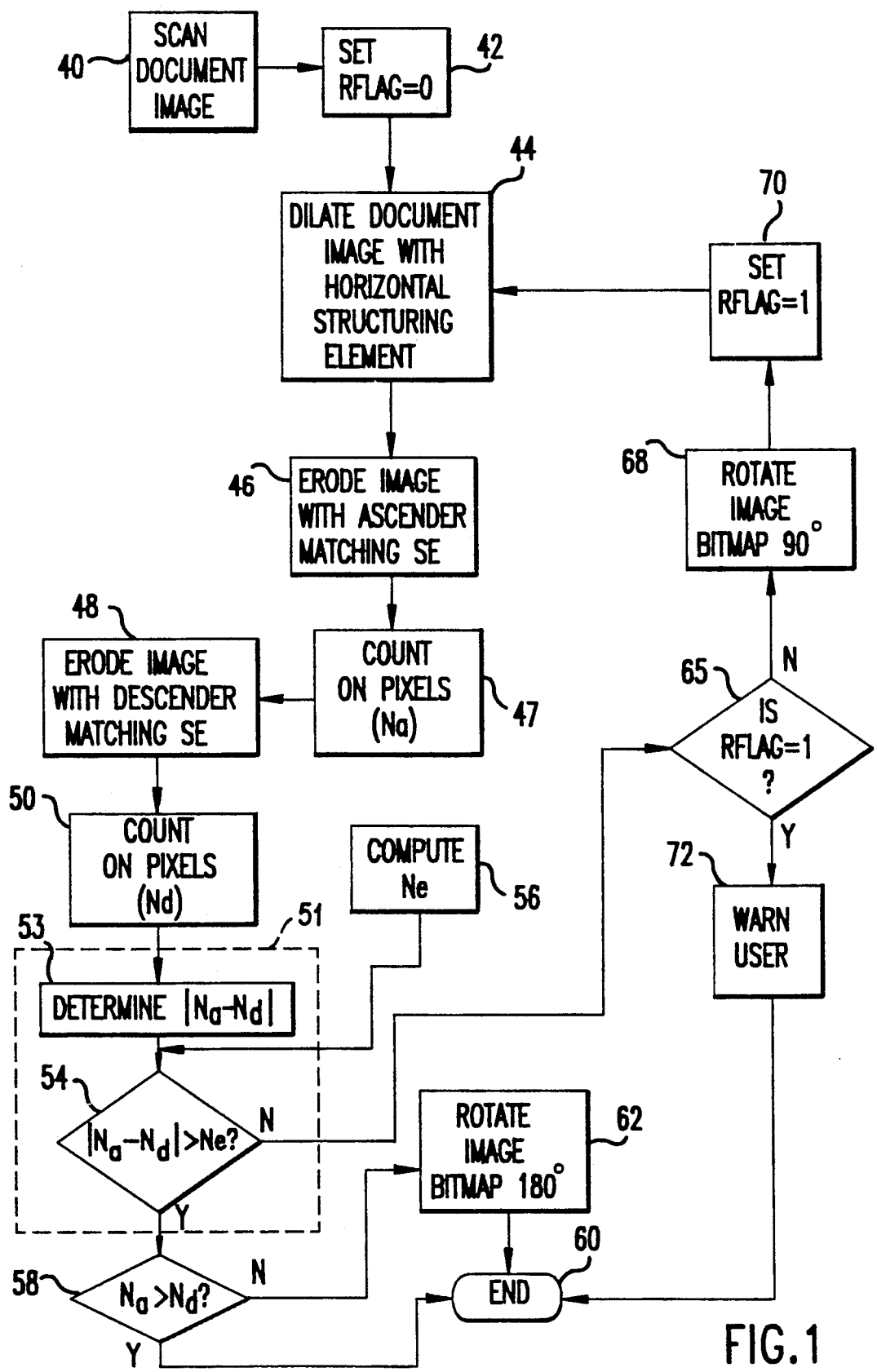
FIG. 1 is a flow chart of a page orientation method of a preferred embodiment of the invention.
Figure 2:
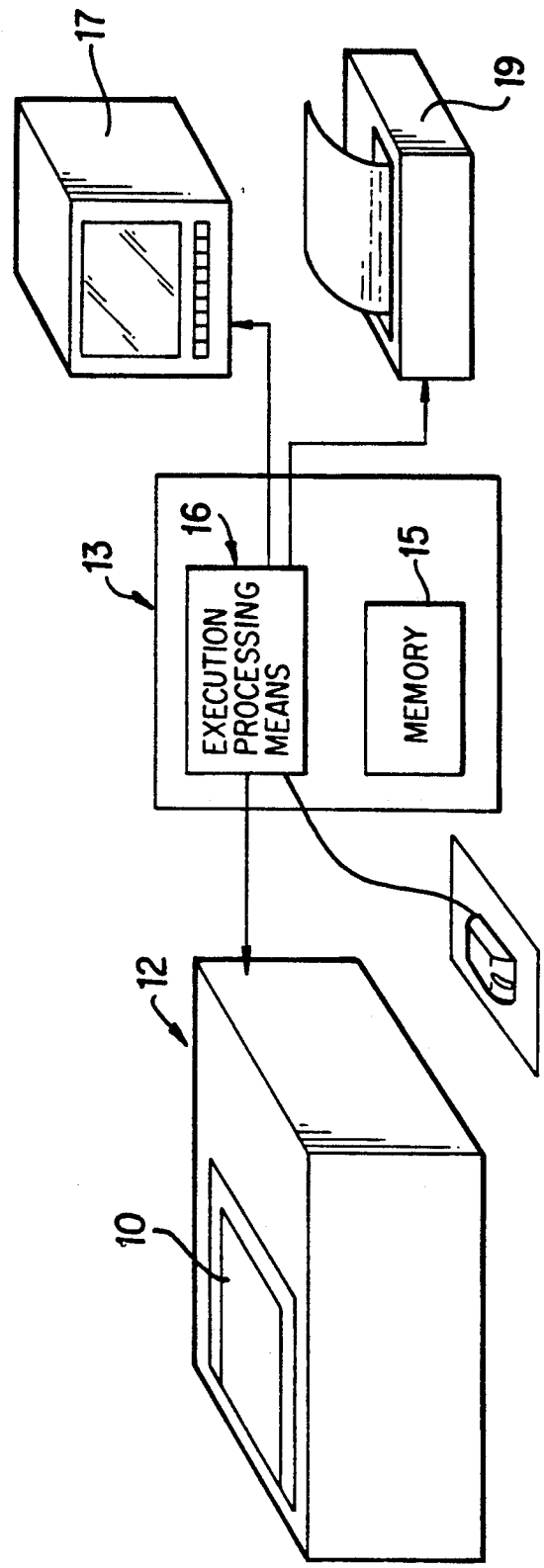
FIG. 2 an apparatus for performing the method of FIG. 1, in accordance with a preferred embodiment of the invention.

A preferred embodiment of the method of the invention, is illustrated in the flow chart of FIG. 1, in conjunction with an apparatus for performing the method shown in FIG. 2.

More particularly, a document containing an image is first scanned for processing, for example, by decoding by optical character recognition techniques, or for processing by nondecoding techniques, such as those described in a concurrently filed patent application entitled "A Method and Apparatus for Automatic Modification of Selected Semantically Significant Image Segments Within a Document Without Document Image Decoding" to Huttenlocher et al., Ser. No. 07/795,174 said application being incorporated by reference herein, or in a concurrently filed patent application entitled "Method and Apparatus for Summarizing a Document Without Document Image Decoding" to Withgott et al., Ser. No. 07/794,543, said application being incorporated by reference herein, or for other similar processing. The scanning, for the purpose of producing an electronic form of the document image 10, may be performed by a scanning means, such as by an optical scanner and sensor. The particular scanning means used may be that of an electronic beam, or the like, or may be, as shown, an electrostatographic reproduction machine 12 that includes receptor or sensor means (not shown) suitable to detect a scanned image that can be digitized to form a digital electronic representation of the image of the document, such as a bitmap image, which is, for example, stored in a memory 15 accessed by a data processing system 13. The data processing system 13 can be a data driven processing system that comprises sequential execution processing means 16 for performing functions by executing program instructions in a predetermined sequence contained in a memory, such as the memory 15.

The bitmap within the memory 15 is processed to determine the orientation of the document image, in accordance with the method, below described in detail.

The image can then be further processed, as desired, and an output produced, for example, for delivery to an output device, such as, the memory 15, or other storage means, or, for example, an output display, which may be, for instance, a facsimile machine, CRT display 17, printer 19, or the like. Alternatively, the output from the data processing system 16 may be delivered back to the electrostatographic reproducing machine 12 for hard copy paper output.

The invention is based upon a statistical property of most Roman text: that there are more character ascenders than descenders. The relative number of character ascenders and descenders within a given text image can be found reliably by methods of morphological image processing that are extremely fast, especially if carried out on a reduced version of the input image.

With reference now to FIG. 1, a flow diagram of the method according to a first preferred embodiment of the page orientation method of the invention is shown. The method determines whether an optically scanned document image is properly aligned or is 90° or 180° out of alignment and automatically rotates a bitmap of the document image to correct any misalignment.

A document containing an image, for instance, of Roman text, such as the text portion of a document 10 shown in FIG. 2 is first scanned 40. As mentioned, the scanning may be performed by known scanning apparatus, or, may be scanned by an electrostatic reprographic copy machine or the like, to produce an electronic representation of the text on the document. The electronic representation of the image can be conveniently a bitmap of the image in which each of the characters of the text are represented by pixel images, each pixel having "on" or "off" states.

It should be noted that, depending upon the application of the method of the invention, it is not necessary to process the entire text contained on the document, so long as a sufficient amount of text is processed in order to determine the number of ascenders and descenders contained in the text.

The electronic representation of the image is then processed to determine the orientation of the text of the document. To begin with, a flag, Rflag, is set 42 to zero. The flag, Rflag, indicates whether the image has been rotated or not.

Figure 3:
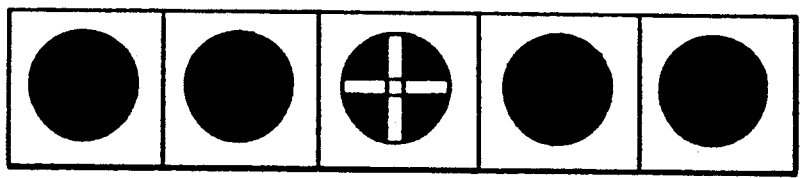
FIG. 3 shows a horizontal structuring for performing a dilation operation in performing the method of the invention.

The scanned image bitmap is then morphologically dilated 44 with a horizontal structuring element as shown in FIG. 3. A dilation is a morphological operation known in the art wherein a given "on" pixel in the source image causes the structuring element to be written into a destination image, with the structuring element center at the corresponding location in the destination image. More particularly, a dilate operation draws the structuring element as a set of pixels in the destination image for each pixel in the source image. For purposes of determining the orientation of the document text, in accordance with a preferred embodiment of the invention, a horizontal structuring element has been found to be suitable. For example, as shown in FIG. 3 a suitable structuring element has a five pixel horizontal structure; however, the number of pixels in the horizontal structuring element can be varied for various embodiments without altering the smearing effect of the dilation operation on the x-height characters of the document image. A horizontal structuring element is chosen, in part, because it is effective in closing up curves in the letters as well as the spaces between characters. In the present case, when the image of the document 10 is processed with a dilation operation using the structuring element of FIG. 3, the result is a dilated image.

Figure 4C:
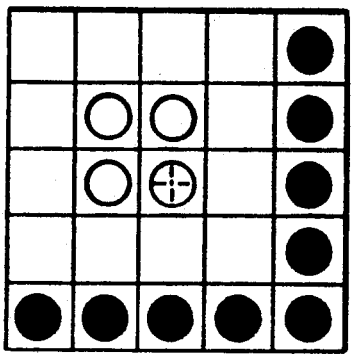
FIGS. 4A-4A', 4B-4B', and 4C-4C' each show a pair of structuring elements for matching character ascenders for use in practicing the method of the invention.
Figure 4C:
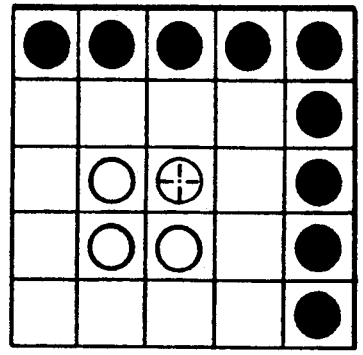
Figure 4B:
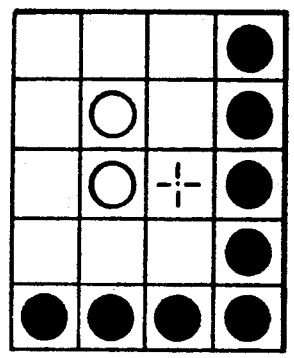
Figure 4B:
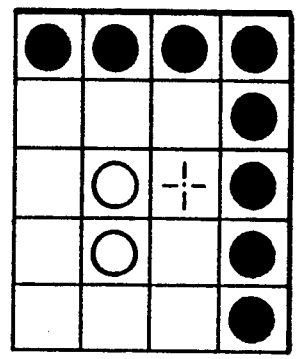
Figure 4A:
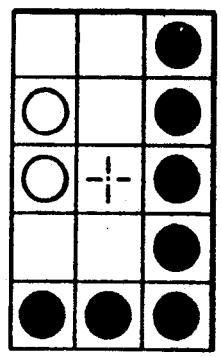
Figure 4A:
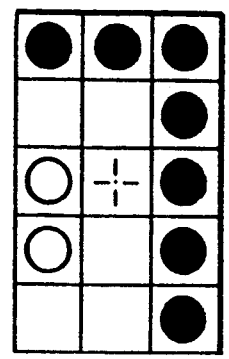

The dilated image is then modified 46 by a morphological erosion operation with a character ascender matching set of structuring elements to enable the number of ascenders to be determined. A few possible structuring elements that are suitable for ascender matching structuring elements are as illustrated in FIGS. 4A, 4A', 4B, 4B', 4C and 4C'. Specifically, FIGS. 4A-4A' shows a set of structuring elements 3 pixels in height and 5 pixels in width; FIGS. 4B-4B' shows a pair of structuring elements 4 pixels in height and 5 pixels in width; and FIGS. 4C-4C' shows a pair of structuring elements 5 pixels in height and 5 pixels in width. The erosion operation may occur using any of the pairs of structuring elements shown (i.e., 4A-4A', 4B-4B', or 4C-4C'), or with other combinations of appropriate character ascender matching structuring elements.

From the image obtained from the erosion operation between the dilated image and the ascender matching set of structuring elements, the number of "on" pixels is counted 47 and represents the number of character ascender pixels, $N_a$.

Figure 5C:
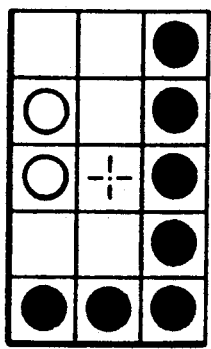
FIGS. 5A-5A', 5B-5B', and 5C-5C' show sets of structuring elements for matching character descenders for use in practicing the method of the invention.
Figure 5C:
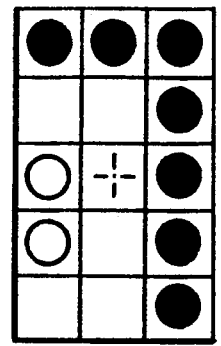
Figure 5B:
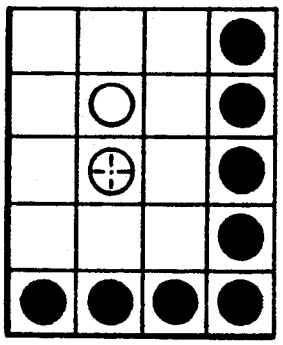
Figure 5B:
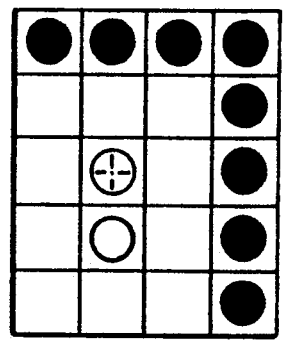
Figure 5A:
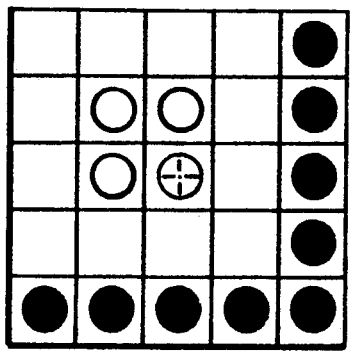
Figure 5A:
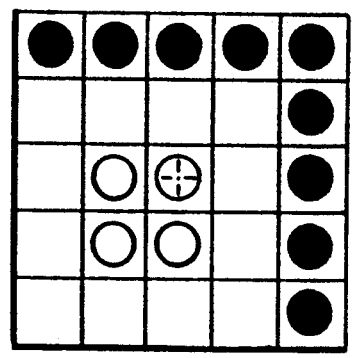

The dilated image is additionally modified 48 by a second erosion operation, this time using a character descender matching set of structuring elements to enable the number of descenders to be determined. A few possible structuring elements that are suitable for descender matching structuring elements are illustrated in FIGS. 5A, 5A', 5B, 5B', 5C and 5C'. Again, other combinations of appropriate character descender matching structuring elements can be used. Specifically, FIGS. 5A-5A' shows a set of structuring elements 3 pixels in height and 5 pixels in width; FIGS. 5B-5B' shows a set of structuring elements 4 pixels in height and 5 pixels in width; and FIGS. 5C-5C' shows a set of structuring elements 5 pixels in height and 5 pixels in width.

From the image obtained from the erosion operation between the dilated image and the descender matching set of structuring elements, the number of "on" pixels is counted 50 and represents the number of character descender pixels, $N_d$.

As mentioned above, the data processing system 13 can be a data driven processing system that comprises sequential execution processing means 16 for performing functions by executing program instructions in a predetermined sequence contained in a memory, such as the memory 15. One instruction program that may be employed to operate the computer to perform the calculations of $N_a$ and $N_d$ is shown in FIG. 6, using a ascenders and descenders scaled 3 high. The program is useful for images at about 75/in resolution.

The results obtained for the numbers of ascender and descender pixels, $N_a$ and $N_d$, are then analyzed. The first analysis determines 51 whether the absolute value of the difference between $N_a$ and $N_d$ has statistical significance, and is performed by first calculating 53 the absolute value of the difference between $N_a$ and $N_d$, then comparing 54 the calculated difference with an expected value, $N_e$, that is computed 56 using random variables on a uniform distribution. One of many statistical algorithms that may be used for approximating the expected value, $N_e$, provides three times the expected standard deviation for random data, wherein the standard deviation for random data equals the sum of the square root of $N_a$ and the square root of $N_d$, that quantity divided by the square root of 2; that is, $$N_e = 3\left(\frac{(\sqrt{N_a} + \sqrt{N_d})}{\sqrt{2}}\right).$$

The results of the comparison are considered significant when:

$$|N_a - N_d| > N_e$$

or $$|N_a - N_d| > 3\left(\frac{(\sqrt{N_a} + \sqrt{N_d})}{\sqrt{2}}\right).$$

It should be emphasized that the computed value of $N_e$ is an arbitrarily chosen approximation of the expected value, and that other expected values can be employed to achieve satisfactory results.

If it is determined 51 that the difference calculated above is significant, then the page orientation is either correct or is 180° from the correct alignment. The page orientation is then determined by comparing 58 the number of character ascending pixels, $N_a$, with the number of character descending pixels, $N_d$. If $N_a > N_d$, i.e., the number of character ascending pixels is significantly greater than the number of character descending pixels, then the first image is properly aligned and the process ends 60. If, however, $N_a \leq N_d$, then the bitmap image of the first image is 180° from the correct alignment. The bitmap can then be rotated 62 by 180° to properly orient the bitmap image before ending the process 60.

On the other hand, when the results of the comparison 54 of $N_a$ with $N_d$ are not significant it is concluded that the page is out of correct alignment by 90°. Thus, either $$|N_a - N_d| \leq N_e$$

or $$|N_a - N_d| \leq 3\left(\frac{(\sqrt{N_a} + \sqrt{N_d})}{\sqrt{2}}\right),$$

indicating that the document image is neither properly aligned nor 180° out of phase (up-side-down). The flag, Rflag, is tested 65 to determine if the bitmap for the document image has yet been rotated: if Rflag=1 the bitmap has been rotated, and if Rflag=0 the bitmap has not been rotated.

If the bitmap has not been previously rotated 90°, the bitmap assumed to be rotated 90°, either clockwise or counterclockwise. A 90° rotation should therefore bring the image either into correct alignment, or 180° from the correct alignment. Thus, the image is rotated 68 by 90°. Upon the rotation of the bitmap by 90°, the rotation flag, Rflag, is set 70 equal to 1 and the dilating and erosion operations are repeated using the rotated bitmap image.

On the other hand, if the bitmap has been previously rotated 90°, the second finding that the comparison is not significant indicates that the alignment of the document image cannot be determined, and the user can be warned 72, if desired.

A second preferred embodiment of the method of the invention determines the orientation of a document image by smearing the x-height characters of the scanned first image by a morphological closing operation, in contrast to the dilating and erosion operations of FIG. 1. A morphological closing operation has the same result as a morphological dilation operation followed by an erosion; consequently, the closing operation performs the steps 44, 46, and 48 illustrated in FIG. 1 in a single operation. Those skilled in the art will recognize other variations of morphological operations that can be employed to realize the various steps in the method of FIG. 1 without altering the overall effect of the method.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of orienting an image of a document of unknown orientation for processing, comprising:
    producing an electronic representation of the image of the document;
    operating on the electronic representation of the image to locate ascenders and descenders of characters in said image, wherein an ascender is a character portion extending upward from a character row and a descender is a character portion extending downward from the character row;
    determining the difference between the number of character ascenders and descenders;
    orienting the electronic representation of the image in a direction based upon the difference between the number of character ascenders and descenders located in said electronic representation.

2. The method of claim 1 wherein said step of orienting the image comprises rotating the electronic representation of the document if the number of ascenders is not larger than the number of descenders.

3. The method of claim 2 further comprising rotating the electronic representation 180° if the number of ascenders is less than the number of descenders.

4. The method of claim 3 wherein said step of rotating the electronic representation comprises rotating the electronic representation 90° if the number of ascenders is neither greater nor less than the number of descenders by a predetermined amount.

5. The method of claim 1 wherein said step of producing an electronic representation of the image of the document of unknown orientation comprises producing a bitmap representation of the image of the document of unknown orientation.

6. The method of claim 1, wherein the step of orienting includes the step of performing data driven processing with a data processing system, the data processing including the steps of:
    retrieving program instructions from memory; and
    performing functions by executing the program instructions in a predetermined sequence.

7. The method of claim 6 further comprising the step of identifying image units in accordance with morphological properties of said image units based on said electronic representation, wherein such image units are used to locate ascenders and descenders in said operating step.

8. A method of orienting an image of a document for processing, comprising:

feeding the document into a document scanner to produce an electronic representation of the image of the document;

morphologically operating on the image to locate the number of character ascenders in the image of the document, wherein a character ascender is a character portion extending upward from a character row;

morphologically operating on the image to locate the number of character descenders in the image of the document, wherein a character descender is a character portion extending downward from the character row;

determining the difference between the number of character ascenders and descenders;

accepting the image as correct if the difference between the number of character ascenders and the number of character descenders is larger than a predetermined amount, reorienting the image 180° if the difference between the number of character descenders and the number of character ascenders is larger than the predetermined amount, and reorienting the image 90° if the difference between the number of character ascenders and the number of character descenders is less than the predetermined amount.

9. The method of claim 8 further comprising reducing the document prior to said steps of morphologically operating on the image to locate character ascenders and descenders in the image of the document.

10. The method of claim 8 wherein said steps of morphologically operating on the image to locate character ascenders and descenders in the image of the document are performed by performing a morphological dilation operation on the image of the document with a horizontal structuring element, followed respectively by performing a morphological erosion with a structuring element having a set of patterns that provide a match to ascenders, and by performing a morphological erosion with a structuring element having a set of patterns that provide a match to descenders.

11. The method of claim 8 wherein said steps of morphologically operating on the image to locate character ascenders and descenders in the image of the document comprise performing a morphological closing operation on the image of the document.

12. A method of orienting a scanned image of Roman text comprising the steps of:

a. dilating the scanned image with a horizontal structuring element to form a dilated image bitmap;

b. eroding the dilated image bitmap with a pattern ascender set of structuring elements, forming a first eroded image bitmap, said pattern ascender set providing ascender pixel integrity, wherein an ascender is a character portion extending upward from the character row;

c. counting a number, $N_a$, of "on" pixels in the first eroded image bitmap;

d. eroding the dilated image with a pattern descending set of structuring elements, forming a second eroded image bitmap, said pattern descending set providing descender pixel integrity, wherein a descender is a character portion extending downward from the character row;

e. counting a number, $N_d$, of "on" pixels in the second eroded image bitmap;

f. when $$|N_a - N_d| \leq 3\left(\frac{\sqrt{N_a} + \sqrt{N_d}}{\sqrt{2}}\right):$$

(1) rotating the bitmap 90°,
(2) aligning a result bitmap, and
(3) repeating step b. through e. on a result bitmap image;

g. and when $$|N_a - N_d| > 3\left(\frac{\sqrt{N_a} + \sqrt{N_d}}{\sqrt{2}}\right) \text{ and } N_a < N_d:$$

(1) rotating the bitmap 180° degrees,
(2) and aligning the result bitmap.

13. A method of orienting a scanned image of Roman text, comprising the steps of:

a) morphologically operating on the scanned image to locate a number of ascenders, $N_a$, in the scanned image, wherein an ascender is a character portion extending upward from a character row;

b) morphologically operating on the scanned image to locate a number of descenders, $N_d$, in the scanned image, wherein a descender is a character portion extending downward from the character row;

c) when an absolute value of $N_a - N_d$ is greater than an expected value, $N_e$ and When $N_a < N_d$:
rotating a bitmap 180°, and placing the 180° rotated bitmap in memory; and d) when the absolute value of $N_a - N_d$ is less than the expected value $N_e$:
rotating the bitmap 90°, placing the 90° rotated bitmap in memory, creating a new first image, and repeating steps a) through d), using the new first image.

14. Apparatus for orienting text on a document of unknown orientation, comprising:

apparatus for scanning the document to produce an electronic representation of the text on the document;

a data processing system for performing data driven processing and which comprises sequential execution processing means for performing functions by executing program instructions in a predetermined sequence contained in a memory means;

said program instructions operating said sequential execution processing means to determine the difference between the number of character ascenders and descenders and to orient the electronic representation of the image based upon the difference between the number of character ascenders and descenders in said electronic representation, wherein a character ascender is a character portion extending upward from a character row, and a character descender is a character portion extending downward from the character row.

15. The apparatus of claim 14 wherein said apparatus for scanning the document to produce an electronic representation of the text on the document comprises an electrostatographic reproduction machine having means for scanning the document.

16. The method of claim 14 wherein said program instructions operate said data processing system to rotate the electronic representation by 180° if the number of ascenders is less than the number of descenders by a predetermined amount.

17. The method of claim 14 wherein said program instructions operate said data processing system to rotate the electronic representation by 90° if difference between the number of ascenders is neither greater nor less than the number of descenders by a predetermined amount.

* * * * *